Oct. 8, 1968

C. E. CARLSON 3,404,516

CORN HARVESTER

Filed Oct. 15, 1965

Inventor
Carl E. Carlson
By Kenneth Cockwith
Attorney

Oct. 8, 1968  C. E. CARLSON  3,404,516
CORN HARVESTER
Filed Oct. 15, 1965  2 Sheets-Sheet 2
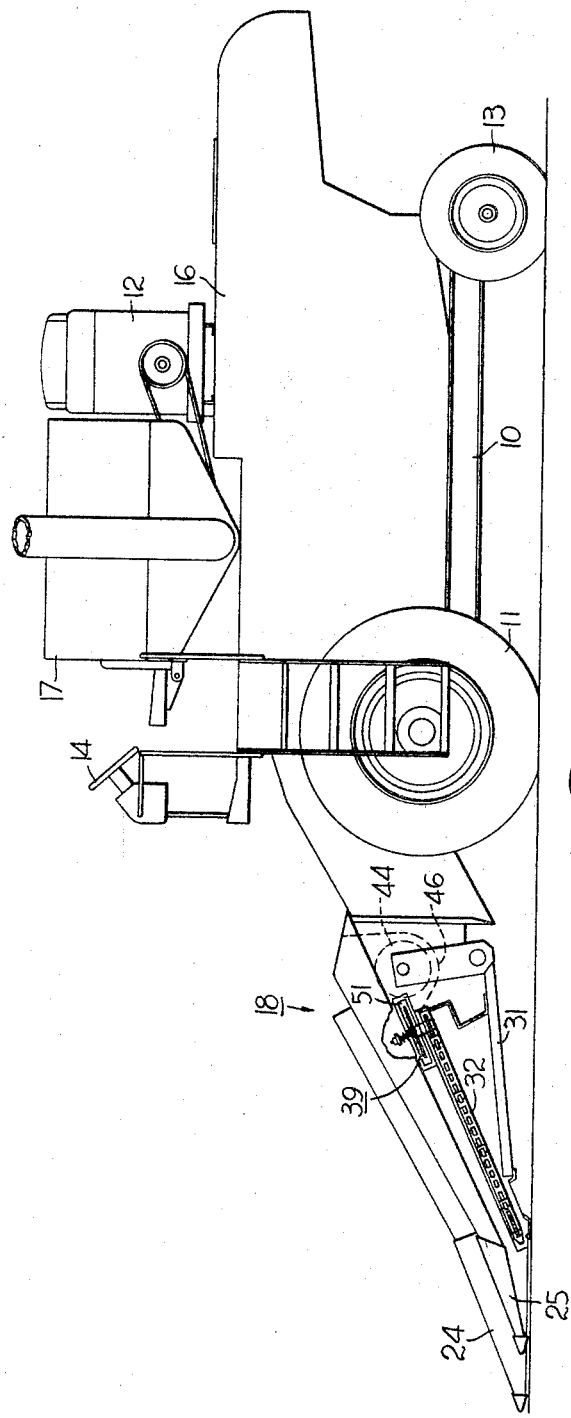
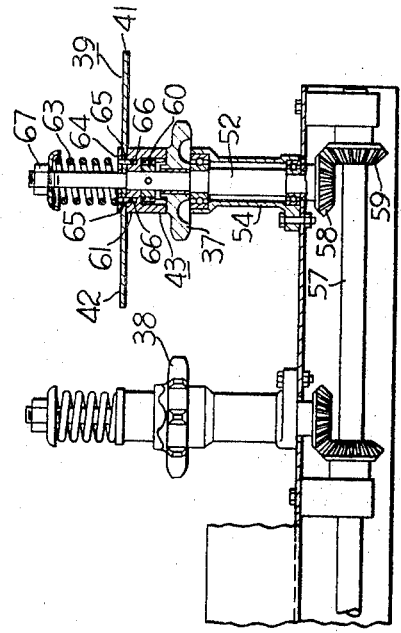
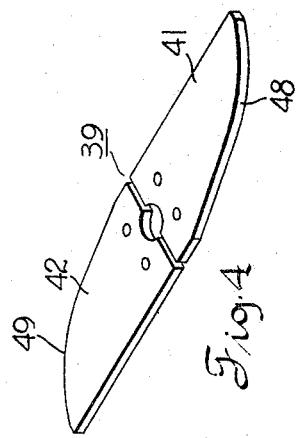
Inventor
Carl E. Carlson
By Kenneth (illegible)
Attorney

United States Patent Office 3,404,516
Patented Oct. 8, 1968

3,404,516
CORN HARVESTER
Carl E. Carlson, Hales Corners, Wis., assignor to Allis-Chalmers Manufacturing Company, Milwaukee, Wis.
Filed Oct. 15, 1965, Ser. No. 496,457
5 Claims. (Cl. 56—18)

ABSTRACT OF THE DISCLOSURE

An auxiliary feed means for a corn harvester wherein said feed means operates in assisting the conveying of material from a conveyor mounted above snapping rolls to a cross conveyor mounted to the rear of such snapping rolls.

---

This invention relates to a novel feed assister for corn harvesters.

Corn harvesters are provided with a relatively narrow throat area at the rear end or top of the gathering chains and this area has presented some blockage or plugging problems, this being particularly true when operating under conditions where the crop material is light and dry and tends to build up above and beyond the path of the gathering chains.

The present improvement contemplates a feeder arm associated with one of the gathering chain slip clutches for each row of corn or crop material and of sufficient length to sweep the throat area above the upper ends of the gathering chains. The location and configuration of the feeder arms effectively eliminates plugging in the throat area.

Another object of this invention is to provide an auxiliary feeder in a corn harvester wherein such feeder will continue to operate despite the fact that the conveyer chains have been inactivated by their slip clutch due to overload.

Another object of this invention is to provide an auxiliary feeder in a corn harvester and being so positioned and configured so as to wipe material from the conveyer chains of the harvester and be in turn wiped by a cross conveyer in the harvester.

These and other objects of the invention will become more apparent from the following detailed description in which:

FIG. 2 is a side elevation of the harvester shown in FIG. 1 with a portion removed for clarity of illustration;

FIG. 3 is a section view taken on line III—III of FIG. 1 with portions removed for clarity of illustration; and FIG. 4 is an enlarged perspective view of the auxiliary feeder shown in the other figures.

Figure 1:
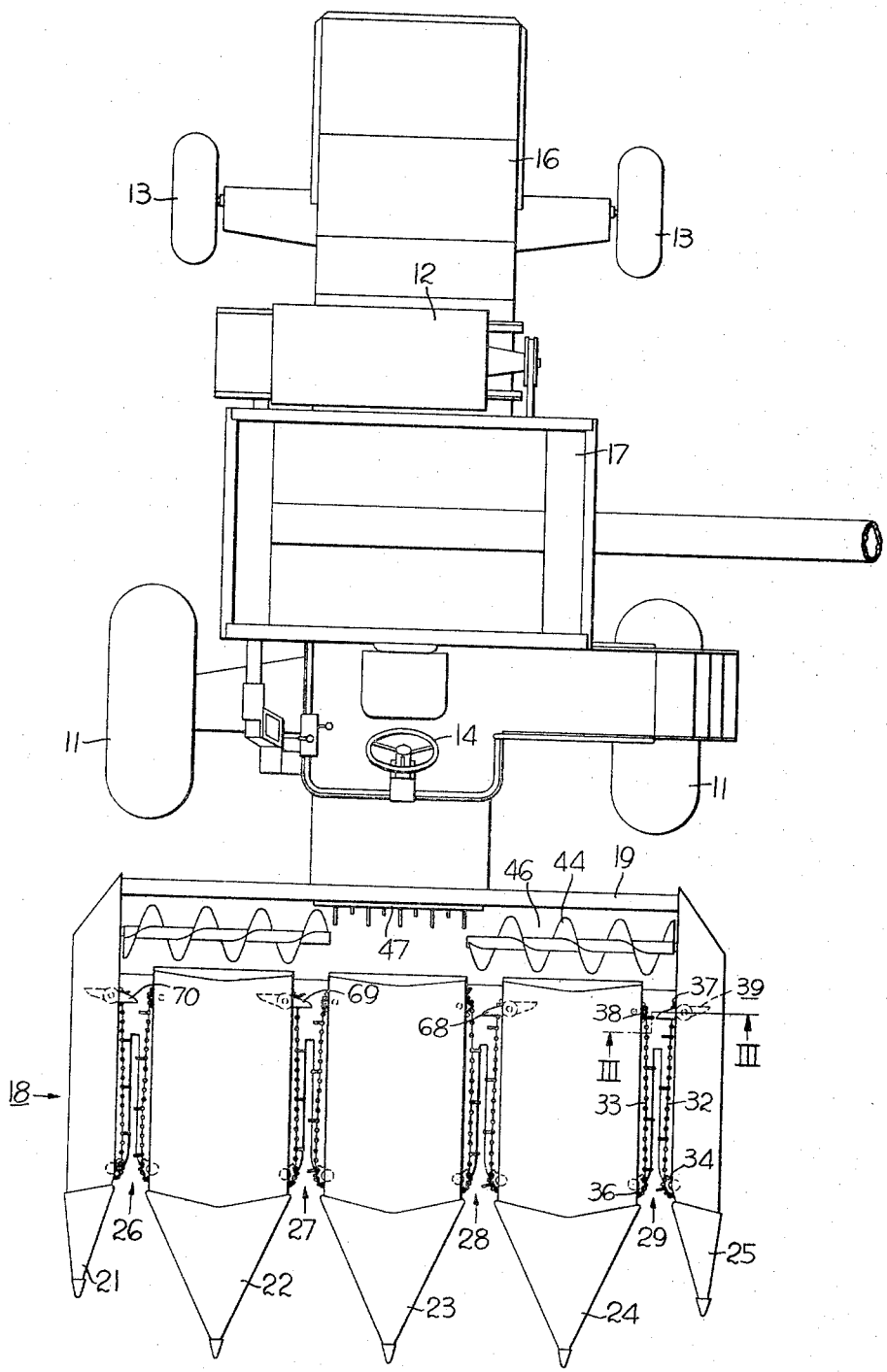
FIG. 1 is a plan view of a four row self-propelled corn harvester embodying the invention.

Referring to FIG. 1, it is seen that the present invention has been embodied in a four row self-propelled corn harvester for purposes of illustration. This invention can be embodied in either a self-propelled corn harvester or a pulled type of harvester having mechanism for handling one or more rows of corn.

This self-propelled harvester shown includes a frame 10, driving wheels 11 carried by said frame and being operatively connected with an engine 12. The rear end of frame 10 is supported by dirigible wheels 13 operatively connected to a steering wheel 14 by suitable mechanism (not shown). A corn threshing and cleaning mechanism (not shown) is incorporated in body 16 carried by frame 10. A grain tank 17 is mounted on frame 10 to receive grain from the aforementioned threshing and cleaning mechanism.

A corn header 18 is connected to the front end of body 16 and includes a cross-frame member 19 having sheet metal dividers 21, 22, 23, 24 and 25 extending forwardly therefrom. Each of these dividers is spaced apart to provide space for a row of corn to pass therebetween to be contacted by corn snapping equipment 26, 27, 28 and 29 respectively which may consist of conventional snapping rolls or snapping rolls underlying stripping plates as is shown in the patent to Fergason, U.S. 2,663,983, reference to which may be had if further details are desired.

A subframe 31 (see FIG. 2) rotatably supports a pair of endless conveyors 32 and 33 (FIG. 1) by means of idler sprockets 34 and 36 at the front ends of the conveyers and drive sprockets 37 and 38 at the rear ends of the conveyors. Drive sprockets 37 and 38 are drivingly connected to engine 12 by conventional means all of which are not shown.

Referring to FIG. 3, a feed assister 39 consisting of two separate arms 41 and 42 is mounted on a slip clutch 43 which drives the outer gathering chain 32. A transverse auger 44 is carried by subframe 31 as is a floor 46 underlying the auger. Transverse auger 44 is positioned (see FIG. 1) in receiving relation to ears of corn and material moved rearward by conveyors 32 and 33 and feed assister 39. Auger 44 is connected so as to move material toward the longitudinal center line of the harvester at which point feeder 47 rotatably carried by body 16 contacts the material and moves it rearwardly into body 16 for shelling and cleaning. It is to be noted that assister 39 rotates in such a direction that at its closest position to auger 44, it is moving in the opposite direction to which auger 44 is moving material and accordingly auger 44 tends to wipe off any material being carried by assister 39. The feed assister arms 41 and 42 (FIG. 4) are formed so their leading edges 48 and 49 respectively curve inwardly toward their outer ends. The receding leading edges 48 and 49 of the feeder arms urge the crop material rearwardly through the throat area and yet effectively prevent, in cooperation with auger 44, the arms from carrying the material around into slot 51 in the sheet metal shielding of point 25. Referring again to FIG. 3, the drive for the gathering chain sprocket 37 includes a vertical shaft 52 journaled in rigidly mounted housing 54, said shaft being driven by a transverse drive shaft 57 through a pair of bevel gears 58 and 59. The upper portion of shaft 52 rigidly mounts a collar 60 which includes a spline connection with a jaw clutch member 61 for driving same. Gathering drive chain sprocket 37, provided with mating jaws is driven by the clutch member 61 with the driving connection being releasably maintained by an adjustable compression spring 63. The feed assister 39 is rigidly secured to the upper face of clutch member 61 between said face and retainer washer 64 by means of roll pins 65. The roll pins 65 pass through openings in retainer 64, arms 41 and 42, and into openings 66 in the clutch member 61. Two roll pins pass through each arm. The openings 66 are slightly oversize so that the pins can be readily removed from the clutch member 61.

Under some crop conditions including vines or long grass, it might be desirable to remove one or both of the feeder assist arms to prevent wrapping. This can be easily done by loosening or removing nut 67 from the upper end of shaft 52 to relieve the spring 63 and then removing washer 64 and pins 65 from clutch member 61. It should be noted that this can be accomplished without removing any shielding.

It should now be apparent that a rotating feed assister has been provided which is advantageously positioned with respect to the incoming crop material and transverse auger to help move material and prevent clogging. The feed assister arms are shaped so as to assist the crop material rearwardly through the throat area at the top of the gathering chains without carrying the material around to cause wrapping and plugging. The construction is such that servicing of the feed assister can be readily accomplished without requiring the removal of any shielding.

It should also be noted that the feed assister is directly connected to the driving portion of the slip clutch so that even if the clutch is slipping due to plugging of the conveyer, the feeder assister will still be operating to clear away material and thereby aid in clearing of the plugged conveyer.

Only one feed assister has been explained in detail although a four row corn harvester is shown in the drawings. It is to be understood that for each row of corn, a feeder assister is utilized which is the same as feeder assister 39 and a repetitive explanation is not thought to be necessary. In the other three rows, feeder assisters 68, 69 and 70 are provided as indicated in FIG. 1. To provide proper coordination with auger 44, it is necessary that the feeder assisters be mounted on the particular slip clutches indicated. If, for example, feed assister 39 were mounted above sprocket 38 there would be a tendency for the feed assister to move material aided by the movement of auger 24 around and back under divider shield 24.

The embodiments of the invention in which an exclusive property or privilege is claimed are defined as follows:

1. In a corn harvester, the combination of: a picker unit positioned to pick ears of corn from standing stalks;
    a conveying unit positioned over said picking unit for moving picked ears of corn and material rearwardly;
    a cross conveyer poitioned rearwardly of said conveying unit and extending transversely to said conveying unit in picked ear and material receiving relation thereto for moving said picked ears of corn and material to a central point;
    means for driving said conveying unit including a slip clutch therefor positioned above said unit adjacent the rear end thereof for disconnecting the drive to said unit upon overload thereof;
    an auxiliary feed means carried by said slip clutch in superposed relation to said unit and for rotation therewith in a plane parallel to the plane of operation of said unit for assisting in moving picked ears and material from said unit to said cross conveyer, and wherein said auxiliary feed means includes an arm positioned beneath a guiding shield and such arm moves through a slot in said shield over said unit.

2. In a corn harvester as recited in claim 1 and wherein said auxiliary feed means is moving in a direction opposite to the direction of movement of said cross conveyer at their closest point so that said cross conveyer wipes material from said auxiliary feed means.

3. In a corn harvester as recited in claim 2 and wherein said arm being mounted on the drive portion of said slip clutch and said arm being so configured that the leading edge curves rearwardly from the receding outer end of said arm to its point of attachment with said clutch for permitting material to be readily stripped therefrom by action of said cross conveyer.

4. In a corn harvester as recited in claim 1 and wherein said arm being mounted on the drive portion of said conveyer clutch whereby said arm may continue to operate when said clutch has inactivated said conveyer.

5. In a corn harvester as recited in claim 4 and wherein said arm when transversely radially extended extends beyond said conveying unit and the outer end thereof moves at a greater speed than said conveying unit for moving picked ears of corn and material from said conveying unit to said cross conveyer.

References Cited

UNITED STATES PATENTS 2,912,812  11/1959  Aasland _____ 56—18
3,101,579   8/1963  Karlsson et al. _____ 56—18

ANTONIO F. GUIDA, *Primary Examiner.*